United States Patent [19]

Horie et al.

[11] Patent Number: 5,027,734
[45] Date of Patent: Jul. 2, 1991

[54] ZIGZAG SEWING MACHINE

[75] Inventors: Fujio Horie; Toshimichi Asai, both of Nagoya, Japan

[73] Assignee: Brother Kogyo Kabushiki Kaisha, Nagoya, Japan

[21] Appl. No.: 597,344

[22] Filed: Oct. 15, 1990

[30] Foreign Application Priority Data

Oct. 31, 1989 [JP] Japan .................................. 1-285301

[51] Int. Cl.$^5$ .............................................. D05B 3/02
[52] U.S. Cl. ..................................... 112/451; 112/454; 112/317
[58] Field of Search ............... 112/451, 454, 456, 458, 112/453, 317, 316

[56] References Cited

U.S. PATENT DOCUMENTS

4,563,963  1/1986  Hanyu ............................ 112/451 X
4,781,134  11/1988 Horie ............................. 112/317 X
4,962,715  10/1990 Hyodo et al. .................... 112/454 X

Primary Examiner—Peter Nerbun
Attorney, Agent, or Firm—Oliff & Berridge

[57] ABSTRACT

A zigzag sewing machine comprises a pattern data memory, a fixing stitch memory, a read-out unit, a controller, a determination unit, a switch-over mechanism and a stitch forming mechanism. The read-out unit reads out pattern stitch data from the pattern data memory means. Based on the read-out stich pattern data, the controller controls the stitch forming mechanism to form a pattern on a fabric. If a repeat sewing mode is selected, the controller repeatedly sews the pattern. Meanwhile, the determination unit determines if a given pattern whose sewing is in progress is a predetermined last pattern or a pattern which was not initially designated as a last pattern but was later redesignated as a last pattern by mode switching. If the determination unit determines that the pattern whose sewing is in progress is the last pattern, the switch-over mechanism stops the read-out unit from reading out further pattern stitch data and switches over the read-out unit to the fixing stitch read-out mode after the sewing of the last pattern is completed. Then, based on the result of the determination, the controller drives the stitch forming mechanism to form fixing stitches after the last pattern is sewn.

19 Claims, 5 Drawing Sheets

* A black dot represents a set of fixing stitches incorporated into pattern stitch data.

○ A circle indicates a point where fixing stitches need to be sewn.

FIG. 1

FIG. 2 DATA OUTPUT PROGRAM

ZIGZAG SEWING MACHINE

BACKGROUND OF THE INVENTION

1. Field of the invention

The present invention relates to a zigzag sewing machine. More particularly, the present invention relates to a zigzag sewing machine that can successively form a plurality of patterns by repeatedly sewing a preselected pattern. Related art In a conventional zigzag sewing machine, stitch data corresponding to predetermined patterns is stored in a memory. Under control of a microcomputer, the stitch data is read from the memory and a control signal is sent to a stitch forming mechanism, thereby controlling the operation of a needle and a feed dog. In this way, a pattern is automatically formed on a fabric in repetition.

However, when a plurality of patterns are successively sewn, fixing stitches normally must be formed at the beginning and the end of each pattern to prevent thread from loosening. Forming three stitches at the beginning and the end of each pattern is one such method of preventing thread loosening. Forming fixing stitches, however, must have been manually done, making pattern sewing time-consuming and tiresome. Fixing stitches must have been formed manually because fixing stitch data could not be included in pattern forming data. More particularly, if fixing stitches at the beginning and the end of each pattern is included in stitch forming data, the fixing stitches formed at the end of one pattern coincide with the fixing stitches of the beginning of the next adjacent pattern. Therefore, two sets of fixing stitches are formed between adjacent patterns. This reduces the aesthetical value of the patterns and damages the fabric.

SUMMARY OF THE INVENTION

An object of the present invention made to overcome the aforementioned problem is to provide a zigzag sewing machine that can automatically form fixing stitches at the ending point of a plurality of successively sewn patterns.

Another object of the present invention is to provide a zigzag sewing machine that does not require a time-consuming, tiresome manual operation to form fixing stitches.

A zigzag sewing machine of the present invention made to attain the above objects comprises: a pattern data memory means for storing pattern stitch data corresponding to patterns; a fixing stitch memory means for storing fixing stitch data for forming fixing stitches; a read-out means for reading out the pattern stitch data from the pattern data memory means or the fixing stitch data from the fixing stitch memory means; a control means for controlling the operation of a stitch forming mechanism including a needle to form a predetermined pattern on a fabric based on the read out pattern stitch data and the fixing stitch data, wherein the control means can execute a repeat sewing mode for causing the stitch forming mechanism to form a plurality of patterns successively; a determination means for determining if a given pattern is the last pattern of the plurality of the patterns to be sewn in the repeat sewing mode; and a switch-over means for switching the read-out means over to a fixing stitch read-out mode to cause the stitch forming mechanism to form fixing stitches at the end of the last pattern when the determination means determines that the last pattern is being sewn.

In the zigzag sewing machine thus constructed, the read-out means reads out pattern stitch data from the pattern data memory means. Based on the read-out stitch pattern data, the control means controls the stitch forming mechanism to form a pattern on a fabric. If the repeat sewing mode is selected, the control means repeatedly sews the pattern. Meanwhile, the determination means determines if a given pattern whose sewing is in progress is a predetermined last pattern or a pattern which was not initially designated as a last pattern but was later redesignated as a last pattern by mode switching. If the determination means determines that the pattern whose sewing is in progress is the last pattern, the switch-over means stops the read-out means from reading out further pattern stitch data and switches over the read-out means to the fixing stitch read-out mode after the sewing of the last pattern is completed. Then, based on the result of the determination, the control means drives the stitch forming mechanism to form fixing stitches after the last pattern is sewn.

DETAILED DESCRIPTION OF THE PREFERRED EMBODIMENT

Explained below with reference to the attached drawings is a zigzag sewing machine embodying the present invention which selects a desired pattern from a plurality of pattern and forms the selected pattern repeatedly.

Figure 1:
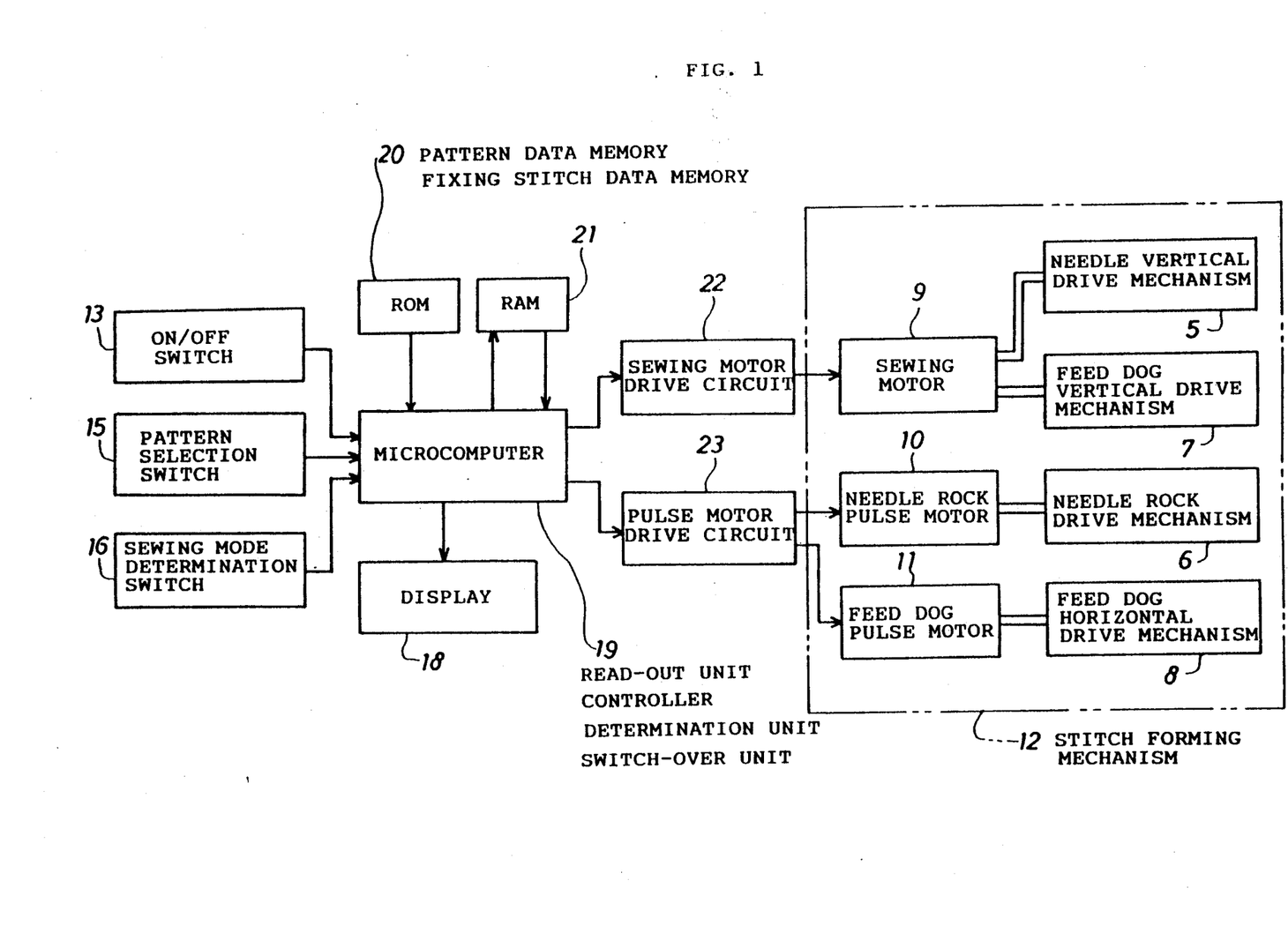
FIG. 1 is a block diagram of a zigzag sewing machine of an embodiment of the present invention.
Figure 4:
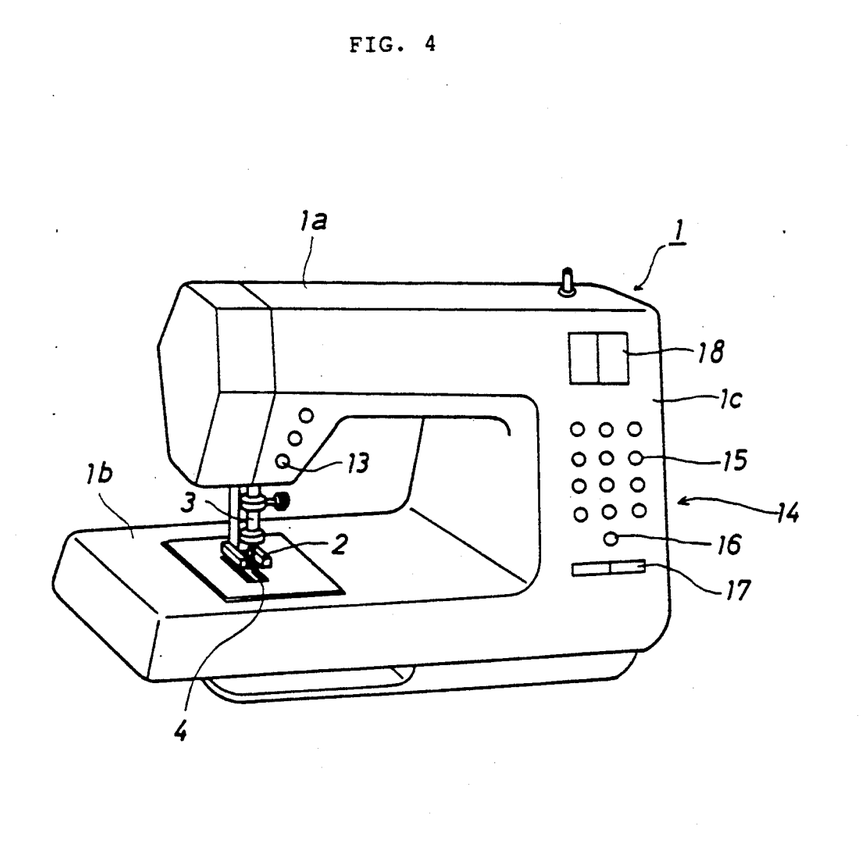
FIG. 4 is a perspective view of the zigzag sewing machine of the embodiment.

Referring to FIG. 4 illustrating a perspective view of the zigzag sewing machine of the present embodiment, a needle bar 3 is mounted on the end of an arm 1a. A needle 2 is attached to the top of the needle bar 3. A feed dog 4 is provided in a bed 1b opposed to the needle 2. Provided in the arm 1a are a needle vertical drive mechanism 5 for driving the needle bar 2 and a needle rock drive mechanism 6. Furthermore, as shown in FIG. 1, a feed dog vertical drive mechanism 7 and a feed dog horizontal drive mechanism 8 for driving the feed dog 4 is provided in the bed 1b. The needle bar vertical drive mechanism 5 and the feed dog vertical drive mechanism 7 are driven by a sewing motor 9, while the needle rock drive mechanism 6 is driven by a needle rock pulse motor 10. The feed dog horizontal drive mechanism 8 is driven by the feed dog pulse motor 11. The above motors and drive mechanisms compose a stitch forming mechanism 12.

The arm 1a is also provided with an on/off switch 13 for starting and stopping sewing. A side 1c of the body 1 is provided with an operation panel 14, which includes pattern selection switches (numerical pad) 15, a sewing mode selection switch 17, and a speed control switch 17. An LCD display 18 for displaying various sewing conditions is provided above the operation panel 14.

The electrical construction housed in the body 1 is explained below.

A microcomputer 19 is provided with programs and functions as a read-out unit, a control unit, a determination unit, and a switch-over unit, and receives signals from the on/off switch 13. The microcomputer 19 sends display signals to the display 18. A ROM 20 is provided with stitch data corresponding to a variety of patterns while a RAM 21 temporarily stores the stitch data. The ROM 20 and the RAM 21 are connected to the microcomputer 19.

Stitch data for each pattern are composed of zigzag data representing the rocking amount of the needle bar 2 and feed data representing the feed of the feed dog 4 and is stored in a corresponding address. The sewing motor 9 receives control signals from the microcomputer 19 via a sewing motor drive circuit 22. The needle rock pulse motor 10 and the feed dog pulse motor 11 receive control signals from the microcomputer 19 via the pulse motor drive circuit 23.

Figure 5:
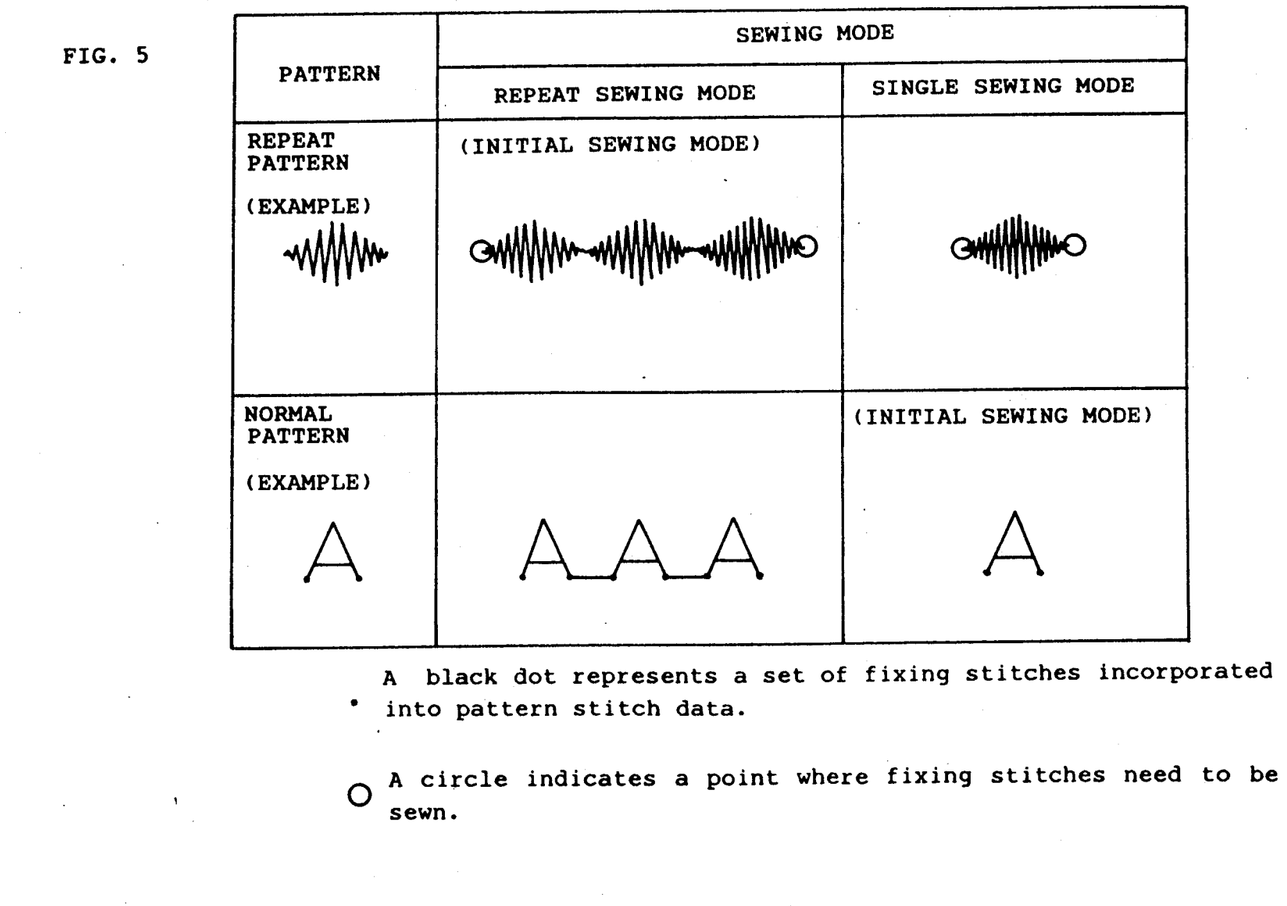
FIG. 5 is a chart showing examples of patterns and sewing modes of the patterns available in the zigzag sewing machine of the embodiment.

Two types of patterns, repeat pattern and normal patterns, are provided in the ROM 20 and available to be selected by the selection switches 15. The diamond-shaped pattern shown in FIG. 5 and other design patterns are the repeat patterns while character patterns and drawings including the "A" character pattern also shown in FIG. 5 are the normal patterns. The two types of the patterns both contain many different patterns. Since the repeat patterns are usually repeatedly sewn, a repeat sewing mode is automatically set for sewing thereof. The stitch pattern data for the repeat patterns are not coupled with fixing stitch data. Therefore, fixing stitches are not formed at the beginning and the end of each repeat pattern. On the other hand, because the normal patterns are usually sewn individually, not repeatedly, an individual sewing mode is set for sewing the normal patterns. Therefore, fixing stitches are formed at the beginning and the end of each normal pattern. Because normal patterns are separately placed between spaces when being repeatedly sewn, fixing stitches need to be formed at the beginning and the end of each normal pattern; thus, the pattern stitch data for the normal patterns stored in the ROM 20 is accompanied by fixing stitch data.

The operation of the zigzag sewing machine of the present embodiment is explained hereinafter.

The distinctive feature of the present embodiment is, as explained above, to automatically form fixing stitches at the beginning and the end of a single repeat pattern to be sewn in the single sewing mode or at the beginning and the end of a plurality of repeated patterns to be sewn in a repeat sewing mode. Therefore, fixing stitch forming in the sewing of repeat patterns is mainly described below in reference to the flowcharts of FIGS. 2 and 3, and an explanation of the process of normal pattern forming is dispensed with.

Figure 3:
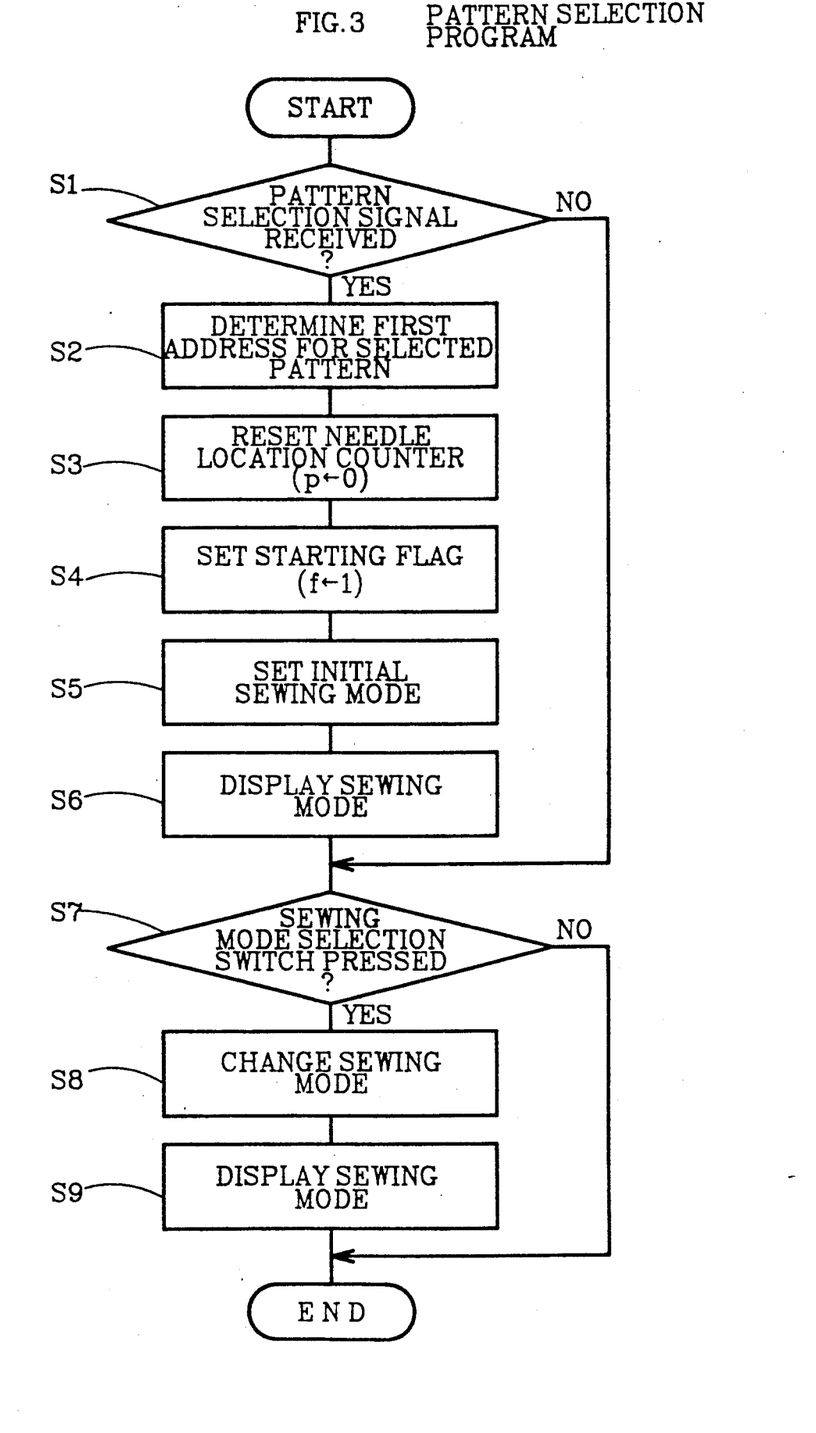
FIG. 3 is the flowchart of a pattern selection program of the embodiment.

When not executing a data output program, the microcomputer 19 carries out a pattern selection program whose flowchart is shown in FIG. 3, to receive and register signals sent from the pattern selection switches 15. As soon as a desired repeat pattern is selected by the operation of the pattern selection switch 15, the microcomputer 19 determines that a pattern selection signal has been received at step S1. At step S2, the microcomputer 19 determines and stores in a memory the first read-out address in the ROM 20 where the stitch data of the selected repeat pattern is stored. After a needle location counter p is reset (p←0) at step S3, a starting point flag f, which indicates a starting point, is set (f←1) at step S4. Because a repeat pattern has been selected, a repeat sewing flag g (g←1) is set to make the initial sewing mode a repeat sewing mode at step S5 and sends a display signal to the display 18 to display the repeat sewing mode thereon at step S6.

Then, the microcomputer 19 determines if the sewing mode selection switch 16 is pressed by the operator to change the sewing mode at step S7. If it is determined YES at step S7, the process goes to step S8. If the sewing mode setting is switched to a single sewing mode, the above repeat sewing flag g is reset (g←0) at step S8. At step S9, the display signal sent to the display 18 is accordingly changed to indicate that the single sewing mode is on. If the pattern selection switch 15 is pressed to select a normal pattern, the repeat sewing flag g is automatically reset (g←0). Alternatively, if it is determined NO at step S1 because the pattern selection switch is not used, the process goes to step S7. If the sewing mode selection switch 16 is not pressed, it is determined NO at step S7 and the program exits from the process.

Figure 2:
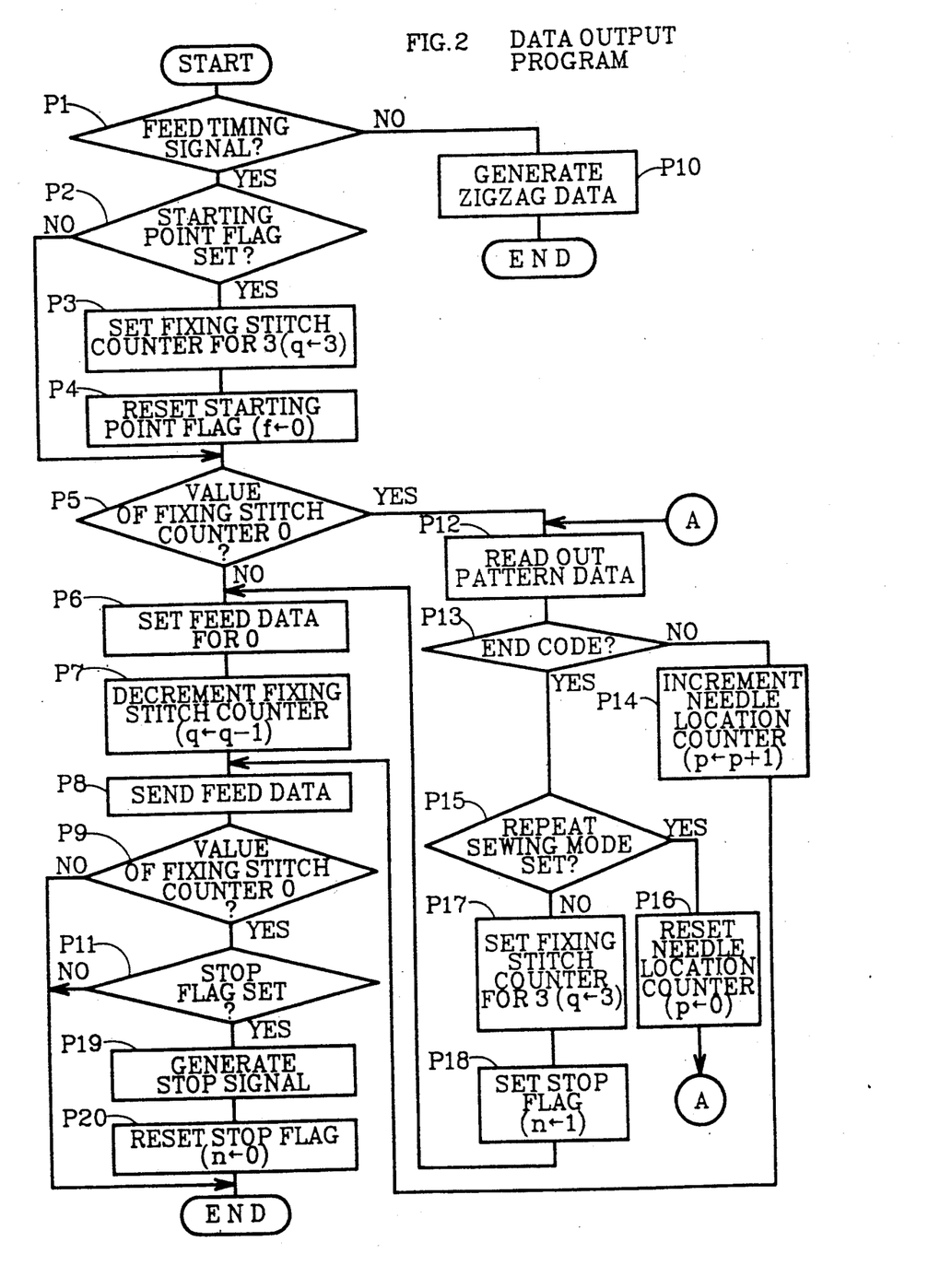
FIG. 2 is the flowchart of a data output program of the embodiment.

If the on/off switch 13 is turned on with the repeat sewing mode being selected, the microcomputer 19 executes the data output program whose flowchart is shown in FIG. 2 in accordance with timing signals sent in synchronization with the vertical motion of the needle bar 2 driven by the rotation of sewing motor 9. Upon receiving a timing signal, the microcomputer 19 determines whether the timing signal is the output timing signal for a feed data (referred to as feed timing signal hereinafter) or the output timing signal for a zigzag data (referred to as zigzag timing signal hereinafter) at P1. Because it is the feed timing signal in this case, it is determined YES at step P1. Next, the microcomputer 19 determines if a starting point flag f is set (f=1) at step P2. A starting point flag f has been set in the pattern selection program. So it is determined YES at step P2 and the process goes to step P3 at which a fixing stitch counter q is set for "3" (q←3). The starting point flag f is reset (f←0) at the next step P4. Because the value of the fixing stitch counter q is not zero in this case, it is determined NO at step P5 and the feed data is set for zero at the following step P6. After the value of the fixing stitch counter q is decremented by 1 (q←q−1) at step P7, the feed data whose value its set for zero is sent to the pulse motor drive circuit 23 at step P8.

As a result of the above, the feed dog 4 is not driven to operate. Then, the microcomputer 19 determines if the value of the fixing stitch counter q is zero at step P9. It is determined NO at step P9 and the program exits from the process.

Next, because the timing signal provided at this point is not a feed timing signal, the microcomputer 19 determines No at step P1 of the data output program. Consequently, a zigzag data is generated at step P10 and program exits from the process. Because a zigzag data is not yet read out, the output value of the microcomputer 19 sent to the pulse motor drive circuit 23 is zero. Accordingly, the needle rock pulse motor 10 and the needle rock drive mechanism 6 are not driven. The needle bar 2 is driven to make a vertical reciprocating movement by the sewing motor 9 without rocking in the lateral direction, hence forming a first stitch.

Because the starting point flag f has been set, the microcomputer 19 determines NO at step P2 and goes to step P5 skipping steps P3 and P4. Then three stitches are formed by repeating the above process at the same point to form fixing stitches at the starting point of the sewing operation. When the third timing signal is sent, the value of the fixing stitch counter q is zero (q=0). The microcomputer 19 accordingly determines YES at a step 9 and goes on to step P11, at which it is determined if a stop flag h is set, that is, if the present stitch is the last stitch formed a the end point. It is determined NO in this case because a stop flag h is not yet set and the program exits from the process.

After fixing stitches are formed at the beginning of the first pattern of a plurality of patterns to be sewn, the microcomputer 19 executes the data output program upon receiving a feed timing signal. The microcomputer 19 goes to step P5 via steps P1 and P2. It is determined YES at step P5 and the process goes to step P12 because the value of the fixing stitch counter q is zero. At step P12, the microcomputer 19 reads out the pattern data consisting of zigzag data and feed data based on the value of the needle location counter p. The pattern data is stored in the first address of the ROM 20 determined in the above-mentioned pattern selection program. Because the above zigzag data and the feed data are not accompanied with an end code, which is provided in the last address of each pattern data to indicate the end of the pattern data, the process goes to step P14 at which the needle location counter p is incremented by 1 (p←p+1). In this case, the needle location counter p is incremented from 0 to 1. The process now goes, to step P8 at which the read-out data is sent to the pulse motor drive circuit 23 and the process goes on to step P9 and to step P11 before termination of the program.

Accordingly, the pulse motor drive circuit 23 drives the feed dog pulse motor 11 to operate the feed dog horizontal drive mechanism 8, hence transferring the fabric corresponding to the feed data by the feed dog 4.

Upon receiving a data output timing signal, the microcomputer 19 goes, via step P1, to step P10 at which zigzag data is sent to the pulse motor drive circuit 23 to drive the needle rock pulse motor 10. The needle 2 is transferred to a location corresponding to the next stitch and forms a stitch at the location.

In this way, feed data and zigzag data corresponding to a pattern are alternately generated to form a selected pattern. Each time a stitch is formed, the needle location counter p is incremented by 1 at step P14 such that the stitch data stored in the accordingly incremented address in the ROM is read out to form a stitch corresponding to the pattern.

After the last stitch data is read out, the end code is read out at step P12. The microcomputer 19 then determines at step P13 that an end code is read out and goes to step P15 where it is determined if the repeat sewing mode is set. It is determined YES at step P15 unless the initially designated repeat sewing mode is not canceled. Then, the needle location counter p is reset (p←0) at step P16 and the process goes to step P12.

As explained above, because the needle location counter p is reset, the microcomputer 19 again successively reads out all the pattern data starting from the pattern data stored in the first address in the ROM 20. Likewise, as long as the repeat sewing mode is on, the pattern is repeatedly sewn.

When the operator presses the sewing mode selection switch 16, that is, when the repeat sewing mode is switched to the single sewing mode, the operation is carried out as follows.

As explained above, the pattern selection program can be executed when the data output program is not executed. Therefore, even when pattern sewing is in progress, the microcomputer 19 allows a mode change to the single sewing mode and resets the repeat sewing flag g (g←0). On the other hand, while the data output program is executed, stitches are formed until the present pattern which is being formed is completed based on the stitch data read out at step P12. When the sewing is completed and the end code is read out at step P12, the process goes to step P13. It is determined YES at step P13 and the process goes to step P17. The microcomputer 19 sets the value of the fixing stitch counter q for "3" (q←3) at step P17, sets the stop flag (h←1) at step P18, and goes to step P6. Then, the process for forming fixing stitches is repeated until the value of the fixing stitch counter q is zero to form three fixing stitches at the end of the sewing. When the value of the fixing stitch counter is zero, it is determined YES at step P9. Then, it is determined YES at step P11, because the stop flag h is set, and the process goes to step P19. The microcomputer 19 sends a stop signal to the sewing motor drive circuit 22 to stop the sewing motor 9 and resets the stop flag h (h←0) at the following step P20 (h←0). The program exits from the process.

If the single sewing mode is designated from the start, fixing stitches are formed at the beginning to be followed by sewing of one repeat pattern. Finally, fixing stitches are formed at the end of the only sewn pattern.

As explained above, in the present embodiment, the microcomputer 19 first forms fixing stitches at the beginning of the first pattern of a plurality of repeat patterns and repeatedly forms the plurality of repeat patterns. Upon detecting that the sewing mode is switched to the single sewing mode, fixing stitches are formed when the sewing of the present pattern is finished forming.

Due to the above-explained feature of the present embodiment, fixing stitches are formed only at the beginning and the end of a plurality of repeat patterns, which frees the operator from the tedious manual fixing stitch operation. Moreover, unlike the conventional system in which each pattern data is paired with fixing stitch data, the present embodiment does not form fixing stitches at either ends of each repeat pattern, preventing two sets of fixing stitches from being formed between adjacent repeat patterns. Therefore, neither the fabric nor the aesthetic value of the sewn patterns are damaged.

While the described embodiment represents the preferred form of the present invention, it is to be understood that changes and variations may be made without departing from the spirit and the scope of the invention.

For instance, in the present embodiment, the sewing mode designation switch 16 is pressed to turn on the single mode sewing mode, which is detected at step P15 of the data output program, in order to terminate the repeat sewing mode. However, the mode change to the single sewing mode may be effected by turning off the on/off switch 13. Likewise, the number of repeat patterns to be sewn may be initially designated so that the mode change to the single sewing mode is detected by reading out the last pattern.

In the present embodiment, pattern data for each pattern is coupled with fixing stitch data for sewing fixing stitches neither at the beginning nor the and of each pattern. However, pattern data coupled with fixing stitch data for the beginning of each pattern may be used. In this case, the microcomputer would detect the end of the last repeat pattern to form fixing stitches. Fixing stitches would be automatically formed at the beginning of the sewing so that one set of fixing stitches is formed between adjacent patterns. Since only one set of fixing stitches is formed, it does not damage the fabric or the aesthetical value of the sewn patterns.

Furthermore, in the present embodiment, fixing stitches consist of three stitches formed at one point. However, each of the three stitches may be very slightly displaced from one another. Also the number of fixing stitches formed at one point is not necessarily three; any number of stitches may be formed as long as threads do not become loose.

The present-embodiment zigzag sewing machine can sew both a variety of repeat patterns and normal patterns. However, the present invention may be applied to a zig zag sewing machine that sews only repeat patters.

As is clear from the foregoing explanation, in accordance with the present invention, the determination unit determines if a given pattern whose sewing is in progress is a predetermined last pattern or a pattern which was not initially designated as a last pattern but was later redesignated as a last pattern by mode switching. If the determination unit determines that the pattern whose sewing is in progress is the last pattern, the switch-over unit stops the read-out unit from reading out further pattern stitch data and switches over the read-out unit to the fixing stitch read-out mode after the sewing of the pattern is completed. Then, based on the result of the determination, the control unit drives the stitch forming mechanism to form fixing stitches after the last pattern is sewn. Therefore, the present invention offers the advantage that the operator is relieved from the tedious and troublesome manual fixing stitch forming.

What is claimed is:

1. A zigzag sewing machine, comprising:
   stitch pattern data memory means for storing stitch pattern data corresponding to patterns;
   fixing stitch data memory means for storing fixing stitch data corresponding to fixing stitches;
   stitch forming means for forming patterns and fixing stitches corresponding to the stitch pattern data and the fixing stitch data, respectively, where the stitch forming means can execute a repeat sewing mode in which the stitch forming means successively forms a plurality of patterns until a last pattern is sewn;
   determination means for determining whether a given pattern being sewn is the last pattern while the stitch forming means executes the repeat sewing mode; and
   switch-over means for directing the stitch forming means to form fixing stitches after the given pattern is sewn when the determination means determines that the given pattern is the last pattern.

2. The zigzag sewing machine of claim 1, in which the stitch forming means forms fixing stitches before stitching a first pattern of the plurality of patterns sewn in the repeat sewing mode.

3. The zigzag sewing machine of claim 1, in which the stitch forming means forms fixing stitches only before stitching a first pattern of the plurality of patterns sew in the repeat sewing mode and when the switch-over means directs the stitch forming means to form fixing stitches.

4. The zigzag sewing machine of claim 1, in which the stitch forming means also executes a single sewing mode in which the stitch forming means forms fixing stitches before and after sewing a single pattern.

5. The zigzag sewing machine of claim 4, further comprising:
   single sewing mode selecting means for selecting the single sewing mode; wherein
   when the single sewing mode is selected while the stitch forming means is in the repeat sewing mode, the determination means determines that the given pattern being sewn is the last pattern.

6. The zigzag sewing machine of claim 1, further comprising repeat sewing mode selecting means for selecting the repeat sewing mode.

7. The zigzag sewing machine of claim 1, in which the stitch forming means forms three stitches at one position under control of the fixing stitch pattern data.

8. A zigzag sewing machine, comprising:
   stitch forming means for forming stitches;
   stitch pattern data memory means for storing stitch pattern data corresponding to patterns;
   fixing stitch data memory means for storing fixing stitch data corresponding to fixing stitches;
   read-out means for reading stitch pattern data from the stitch pattern data memory means in a stitch pattern read-out mode and the fixing stitch data from the fixing stitch memory means in a fixing stitch read-out mode;
   control means for controlling the stitch forming means to form stitch patterns and fixing stitches corresponding to stitch pattern data and fixing stitch data read out by the read-out means, respectively where the control means can execute a repeat sewing mode in which control means controls the stitch forming means to form a plurality of patterns successively until a last pattern is sewn;
   determination means for determining whether a given pattern being sewn is the last pattern while the control means executes the repeat sewing mode; and
   switch-over means for switching the read-out means from the stitch pattern read-out mode to the fixing stitch read-out mode when the determination means determines that the last pattern is being sewn.

9. The zigzag sewing machine of claim 8, in which the control means controls the stitch forming means to form fixing stitches before stitching a first pattern of the plurality of patterns sewn in the repeat sewing mode.

10. The zigzag sewing machine of claim 8, in which the control means controls the stitch forming means to form fixing stitches only before stitching a first pattern of the plurality of patterns sewn in the repeat sewing mode and when the switch-over means switches the read-out means to to fixing stitch read-out mode.

11. The zigzag sewing machine of claim 8, in which the control means also executes a single sewing mode in which the control means controls the stitch forming means to form fixing stitches before and after sewing a single pattern.

12. The zigzag sewing machine of claim 11, further comprising:
   single sewing mode selecting means for selecting the single sewing mode; wherein when the single sewing mode is selected while the control means is in the repeat sewing mode, the determination means determines that the given pattern being sewn is the last pattern.

13. The zigzag sewing machine of claim 8, further comprising repeat sewing mode selecting means for selecting the repeat sewing mode.

14. The zigzag sewing machine of claim 8, in which the stitch forming means forms three stitches at one position under control of the fixing stitch pattern data.

15. A zigzag sewing machine, comprising:
stitch forming means for forming stitches;
stitch pattern data memory means for storing stitch pattern data corresponding to patterns;
fixing stitch data memory means for storing fixing stitch data corresponding to fixing stitches;
read-out means for reading stitch pattern data from the stitch pattern data memory means in a stitch pattern read-out mode and the fixing stitch data from the fixing stitch memory means in a fixing stitch read-out mode;
control means for controlling the stitch forming means to form stitch patterns and fixing stitches corresponding to stitch pattern data and fixing stitch data read out by the read-out means, respectively where the control means can execute
a repeat sewing mode in which the control means controls the stitch forming means to form a plurality of patterns successively until a last pattern is sewn, and
a single sewing mode in which the control means controls the stitch forming means to form fixing stitches before and after sewing a single pattern;
determination means for determining whether a given pattern being sewn is the last pattern while the control means executes the repeat sewing mode; and
switch-over means for switching the read-out means from the stitch pattern read-out mode to the fixing stitch read-out mode when the determination means determines that the last pattern is being sewn; wherein
the control means controls the stitch forming means to form fixing stitches before stitching a first pattern of the plurality of patterns sewn in the repeat sewing mode.

16. The zigzag sewing machine of claim 15, in which the control means controls the stitch forming means to form fixing stitches only before stitching a first pattern of the plurality of patterns sewn in the repeat sewing mode and when the switch-over means switches the read-out means to the fixing stitch read-out mode.

17. The zigzag sewing machine of claim 16, further comprising:
single sewing mode selecting means for selecting the single sewing mode; wherein
when the single sewing mode is selected while the control means is in the repeat sewing mode, the determination means determines that the given pattern being sewn is the last pattern.

18. The zigzag sewing machine of claim 17, further comprising repeat sewing mode selecting means for selecting the repeat sewing mode.

19. The zigzag sewing machine of claim 18, in which the stitch forming means forms three stitches at one position under control of the fixing stitch pattern data.

* * * * *